United States Patent [19]
Ishikawa et al.

[11] Patent Number: 5,940,308
[45] Date of Patent: Aug. 17, 1999

[54] COMPUTER-IMPLEMENTED METHOD AND SYSTEM FOR CREATING MOTOR VEHICLE LAMP DESIGN LAYOUT

[75] Inventors: Masahito Ishikawa; Yoshinori Otuka, both of Shizuoka, Japan

[73] Assignee: Koito Manufacturing Co., Ltd., Tokyo, Japan

[21] Appl. No.: 08/777,383

[22] Filed: Dec. 27, 1996

[51] Int. Cl.[6] ............................ G06F 17/50; G06T 17/00; G06T 15/00

[52] U.S. Cl. ............................................................ 364/512

[58] Field of Search ............................ 345/964; 706/919; 707/502; 364/468.02, 512; 40/556; 382/164, 173, 276, 282, 284, 308, 309, 311, 325, 319, 512

[56] References Cited

U.S. PATENT DOCUMENTS

| | | | |
|---|---|---|---|
| 1,987,697 | 1/1935 | Mead et al. | 240/41.25 |
| 3,487,206 | 12/1969 | Dawson et al. | 240/8.3 |
| 3,700,883 | 10/1972 | Donohue et al. | 240/41.36 |
| 3,798,444 | 3/1974 | Brudy | 240/106 R |
| 3,883,733 | 5/1975 | Nagel | 240/106.1 |
| 4,816,714 | 3/1989 | Walsh | 313/111 |
| 4,855,877 | 8/1989 | Otaka | 362/61 |
| 4,868,725 | 9/1989 | Sakagawa et al. | 362/231 |
| 4,888,713 | 12/1989 | Falk | 345/425 |
| 4,970,666 | 11/1990 | Welsh et al. | 345/423 |
| 5,175,806 | 12/1992 | Muskovitz | 345/425 |
| 5,194,969 | 3/1993 | DiFrancesco | 358/463 |
| 5,255,207 | 10/1993 | Cornwell | 364/512 |
| 5,353,393 | 10/1994 | Bennett et al. | 345/435 |
| 5,369,736 | 11/1994 | Kato et al. | 345/425 |
| 5,448,687 | 9/1995 | Hoogerhyde et al. | 345/425 |
| 5,469,536 | 11/1995 | Blank | 345/431 |
| 5,495,568 | 2/1996 | Beavin | 364/431 |
| 5,596,346 | 1/1997 | Leone et al. | 345/127 |

*Primary Examiner*—Kevin J. Teska
*Assistant Examiner*—Hugh Jones
*Attorney, Agent, or Firm*—Morgan, Lewis & Bockius LLP

[57] ABSTRACT

A method of generating a motor vehicle lamp structure design layout performed using a data processing system including a memory. The method includes the steps of selecting an image set including at least one of a plurality of samples from among image data stored in the memory of the data processing system, the image data representing an image of at least a portion of a motor vehicle lamp structure; generating multiple copies of the selected image set; and creating a motor vehicle lamp structure design layout at least partially composed of the multiple copies of the selected image set, the design layout including image data representing an image of at least a portion of a motor vehicle lamp structure.

21 Claims, 5 Drawing Sheets

5,940,308

COMPUTER-IMPLEMENTED METHOD AND SYSTEM FOR CREATING MOTOR VEHICLE LAMP DESIGN LAYOUT

BACKGROUND OF THE INVENTION

1. Field of the Invention

The present invention relates to a computer-implemented method and system for creating a motor vehicle lamp design layout. More particularly, the present invention relates to a method and apparatus for creating a computer-generated motor vehicle lamp design layout for ultimate use in providing a model to be followed in the construction of an actual motor vehicle lamp. The focus of this invention is primarily on the initial stage of designing an automobile, motorcycle, or other motor vehicle.

2. Discussion of the Related Art

Modern motor vehicles, such as passenger cars, trucks, motorcycles, and the like, are typically equipped with an array of external lighting devices or lamps mounted externally thereon. Headlamps, stop lamps, tail lamps, turn signal lamps, backup lamps, license plate lamps, side marker lamps, and cornering lamps are just some examples of the types of lighting devices in use today.

The lighting devices of motor vehicles today not only provide utilitarian functions, but also increasingly contribute to the overall aesthetic motor vehicle appearance as well. As an example, there currently exists a combination lamp including multiple different lamp units which is totally monochromatic in appearance when unlit but which permits the individual lamp units thereof to glow in different colors when in use. U.S. Pat. No. 4,855,877. This combination lamp therefore can perform multiple lamp functions within the space previously occupied by a single-function lamp and, at the same time, contributes to the overall color scheme of the motor vehicle.

Examples of other types of motor vehicle lamp structures can be found in the following U.S. Pat. Nos.: 1,987,697; 3,487,206; 3,700,883; 3,798,444; 3,883,733; 4,816,714; and 4,868,725. All of the aforementioned U.S. patents are expressly incorporated he rein by reference.

Given the importance of motor vehicle lamp appearance to the overall motor vehicle design, quality lamp design typically involves significant collaboration between the vehicle maker and the lamp designer. In one method of lamp design currently practiced by the inventors, the vehicle maker provides the lamp designer with specifications identifying the rough external dimensions, functionality, and general location of a lamp to be designed. The lamp designer then cuts out a portion of a photograph showing the type of lens desired using a scissors or other cutting device (or, alternatively, makes a hand-made sample), and pastes or glues the cut-out portion of the photograph onto a drawing of the vehicle design.

Using the resulting picture as a model, the vehicle maker and lamp designer come to mutual agreement over the basic characteristics and rough location of the lamp to be designed. The lamp designer then designs and produces an actual motor vehicle lamp based on the agreed-upon specifications.

The aforementioned method of lamp design has many limitations. Most notably, the pasting of a lens photograph cut-out onto a vehicle design drawing does not provide a true and accurate representation of what the finally constructed lamp design will actually look like. Moreover, there exist no means to view how the lamp design will look under variable conditional parameters, such as different types of weather, day/night conditions, what the lamp will look like when lit/unlit, what the lamp will look like from a variety of different angles or viewpoints, and the like. Also, if one desires to change a parameter, such as the color of the vehicle or the type of lens to be used, one must undertake additional cumbersome and time-consuming cutting and pasting operations.

Clearly, there is a need to perform the motor vehicle lamp design procedure in a manner which is faster, more efficient, and less cumbersome. Preferably, this would involve the use of a computer system to overcome these and other disadvantages. Although computer design has been used with success in various other industries, there has yet to be proposed any computer-implemented design procedure for use in the field of motor vehicle lamp design which adequately addresses the aesthetic and functional requirements outlined above.

SUMMARY OF THE INVENTION

Accordingly, the present invention is directed to a method of creating a motor vehicle lamp design layout that substantially obviates one or more of the problems due to limitations and disadvantages of the related art.

An object of the present invention is to provide a computer-implemented method wherein one or more selected image samples representing surface appearance characteristics of a motor vehicle lamp structure, such as a lamp lens structure or a lamp reflector structure, are electronically mapped onto an external frame image. The resulting mapped image has the appearance of one or more occurrences of the selected image sample(s) bounded by the external frame. The mapped image is then displayed and, using computer simulation techniques, viewed from a variety of different viewpoints and/or under a variety of different conditions (night/day, sunny/cloudy, lit/unlit, etc.). Following such evaluation, an optimum mapped image is selected as a final design layout to be used in the construction of an actual motor vehicle lamp or for other purposes.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the method of generating a motor vehicle lamp structure design layout performed using a data processing system including a memory comprises the steps of selecting an image set comprising at least one of a plurality of image samples from among image data stored in the memory of the data processing system, the image data representing an image of at least a portion of a motor vehicle lamp structure; generating multiple copies of the selected image set; and creating a motor vehicle lamp structure design layout at least partially composed of the multiple copies of the selected image set, the design layout comprising image data representing an image of at least a portion of a motor vehicle lamp structure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
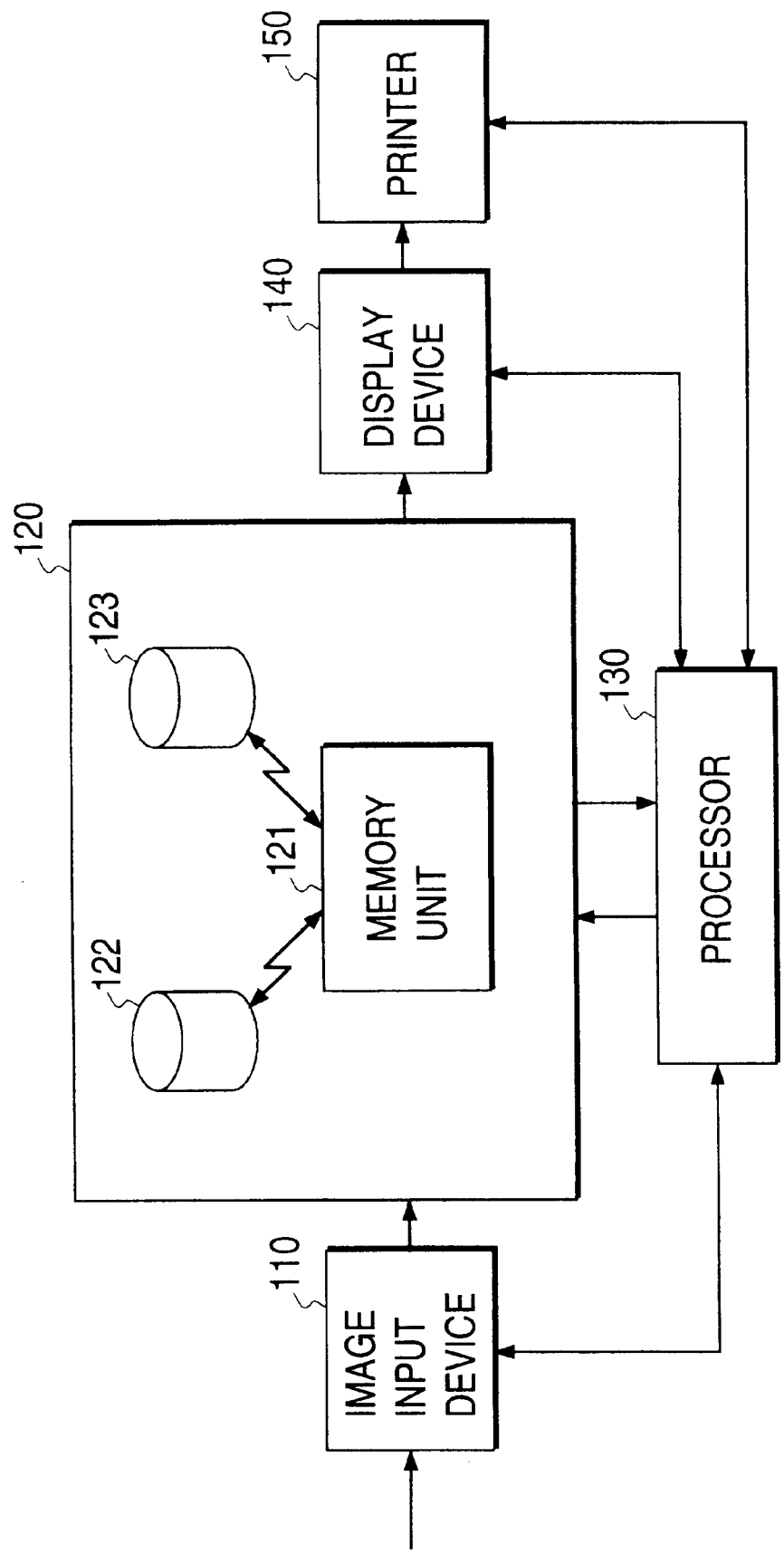
FIG. 1 is a block diagram of an exemplary computer system for performing the method of the present invention.

Reference will now be made in detail to the preferred embodiments of the present invention, examples of which are illustrated in the accompanying drawings, wherein like reference numerals are used to designate like steps or elements throughout the body of this disclosure.

The method of the present invention primarily relates to the initial stages of designing an automobile, motorcycle, or other motor vehicle. As seen from FIG. 1, an exemplary system for performing the method of the present invention includes an image input device 110; memory 120; a microprocessor or other suitable data processing device 130; a display device 140; and a printer device 150. In the diagram of FIG. 1, the memory block 120 is intended to represent various memory components contained in the system, including computer memory 121, hard disk drive memory 122, database 123, buffers, random access memory (RAM), read only memory (ROM), additional memory for storing software, and the like.

The components depicted in FIG. 1 can be incorporated within a single computer system or, alternatively, can be from multiple computer systems. For example, a personal computer can be connected in working operation with a workstation or server in order to provide the structure and functions performed by the data processing components of the system illustrated in FIG. 1.

Figure 2:
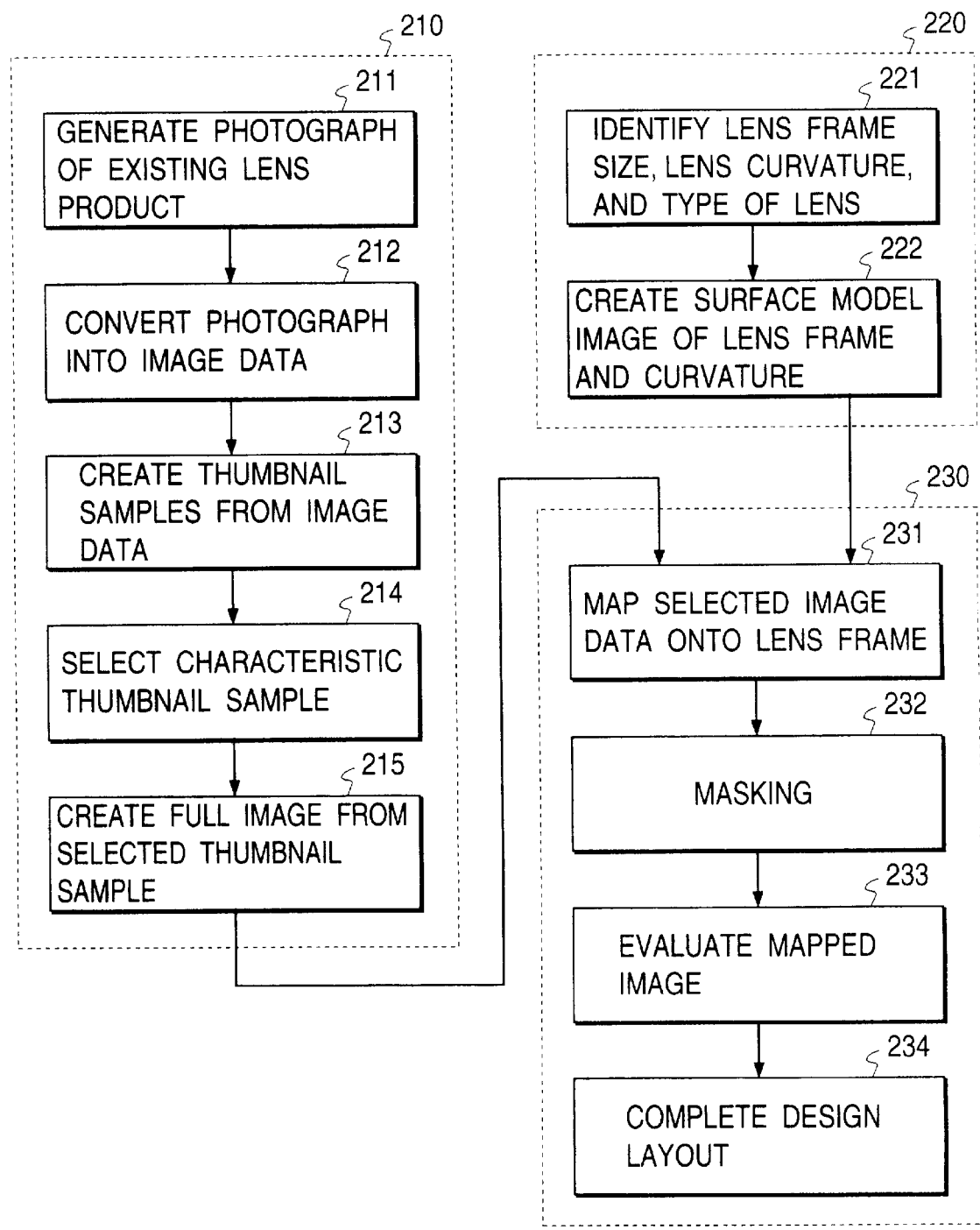
FIG. 2 is a flowchart illustrating steps of a first embodiment of the method of the present invention.

A first embodiment of the method of the present invention is depicted in FIG. 2. The first embodiment may be performed to generate a rear combination automobile lamp layout. Such a rear combination lamp is described in the abovementioned U.S. Pat. No. 4,855,877. Alternatively, the first embodiment may be used to generate a design layout for another type of motor vehicle lamp, such as a headlamp for a car, motorcycle, or truck.

The flowchart of FIG. 2 is divided into three main sections. The first section 210 includes steps performed in the generation and manipulation of motor vehicle lens sample data. The second section 220 includes steps performed in the generation and manipulation of lens external frame (i.e., perimeter) data. The third section 230 includes steps relating to the mapping of the lens sample data resulting from section 210 onto the lens external frame data resulting from section 220 and, thereafter, evaluating the mapped data for suitability as a motor vehicle lamp design layout. In a preferred embodiment of the invention, the steps of section 210 are performed in a personal computer and the steps of sections 220 and 230 are performed in a workstation cooperating with the personal computer.

In section 210, first step 211 involves generating a photograph of an existing lens product (e.g., photographing the lens of an existing motor vehicle lamp using a still camera). The photograph may be taken, for example, while the existing motor vehicle lamp is lit. In step 212, an image scanner is used to convert the photograph into image data. Preferably, the image data contains color information identifying the color or colors of the photographed lens, although it is envisioned that the image data could be monochromatic if so desired. If a digital camera is used to generate the photograph in step 211, then step 212 may be omitted. As is known, the output of a digital camera is already in the form of computer-readable image data.

Steps 211 and 212 are performed by the image input device 110 of FIG. 1. Consequently, image input device 110 may incorporate a still camera and an image scanner or, alternatively, only a digital camera. Image output device 110 then outputs the image data into memory 120.

In step 213, image samples are created from the scanned image data in memory 120 under the control of processor 130. More particularly, the scanned image data is divided into a number (100, for example) of equal-sized substantially square picture elements or image samples. These image samples will be referred to hereinafter as "thumbnails". If the scanned photograph is divided into 100 segments, for example, then each thumbnail would consist of image data corresponding to $\frac{1}{100}$ of the scanned photograph. Thus, each thumbnail is actually a digital representation of a small portion (e.g., $\frac{1}{100}$) of the originally scanned photograph image. The thumbnails may be stored for display on display device 140 in another part of memory separate from the area where the scanned image data are stored. Display device 140 may be, for example, a cathode ray tube (CRT) or other such display.

The operator views the thumbnails displayed on display device 140 in step 214 to select one thumbnail or a block of multiple thumbnails which, according to the judgment of the operator, correspond to the optimum, most usual, or characteristic type of appearance ultimately desired. The single thumbnail or block of thumbnails selected by the operator constitutes a thumbnail set. Thus, each thumbnail set can include either one thumbnail or a block of multiple thumbnails.

Thumbnail selection in step 214 is preferably accomplished by having processor 130 assign a data file to each of the thumbnails for storage of that thumbnail therein. Thus, each data file stores the image data making up a single thumbnail, so that there is a one-to-one correspondence between the thumbnails and data files. If there are 100 thumbnails, for example, then there will be 100 corresponding data files for storing such thumbnails, respectively. The processor 130 creates a list of such data files and stores the data file list in memory 120. The list is displayed in the form of a data file menu. The operator then can perform selection of a thumbnail set by designating or selecting the data file or files listed on the displayed menu which correspond to the thumbnail or block of thumbnails in that thumbnail set. Upon the operator's selection of one or more data files corresponding to a thumbnail set, the selected data file or files are searched for in memory 120 by processor 130. When found, the selected data file or files are stored in a separate part of memory 120. Once again, the selected data file or files stored in memory 120 hold the thumbnail information of the thumbnails making up the selected thumbnail set.

Step 215 is performed next. In step 215, the processor 130 creates full image data from the thumbnail data stored in the selected data file or files. That is, it creates a full image using the image data of the selected thumbnail set. More specifically, processor 130 replicates or copies the thumbnail set multiple times and uses such copies to produce a full image comprising the multiple copies or occurrences of the thumbnail set.

As an example, in the case where the scanned image is divided into 100 thumbnails in step 213, and the thumbnail set is selected to include only one thumbnail in step 214, processor 130 will, in step 215, make 100 copies of the thumbnail set to thereby generate a full image made up of such 100 copies. The resulting full image data will correspond to an image consisting of 100 identical thumbnails, with each thumbnail corresponding identically to the single thumbnail in the selected thumbnail set.

As another example, in the case where the scanned image is divided into 100 thumbnails in step 213, and the thumbnail set is selected to include a block of four different thumbnails, processor 130 will, in step 215, make 25 copies of the four-sample thumbnail set to thereby generate a full image made up of such 25 copies. The resulting full image data will correspond to an image consisting of 25 identical four-sample thumbnail sets, with each thumbnail set of the full image corresponding identically to the four-thumbnail block in the selected thumbnail set.

Essentially, step 215 replaces the scanned image with a full image made up of multiple copies of a small portion of the scanned image. The small portion referred to in the previous sentence corresponds to that portion of the scanned image which the operator has deemed to be optimal. The full image is ultimately stored somewhere in memory 120, such as in database 123, for example. The full or replicated image so stored is then combined with image information resulting from the performance of the steps set forth in section 220 of the flowchart depicted in FIG. 2, as will be discussed in greater detail below.

The steps of section 210 are all preferably performed by the lamp designer. The steps of section 220, on the other hand, are preferably based on initial input provided by the automobile or other motor vehicle maker.

In step 221, the motor vehicle maker provides data regarding the external frame of the lens to be designed and other related information, such as contour information of the lens. As an example, the motor vehicle may provide control drawing specifications in the form of three-dimensional computer-aided-design (CAD) data to the lamp designer either on-line or via transferable memory. Such data may include information pertaining to: the lens frame size (also known as the periphery dimensions of the lens); the curvature dimensions of the lens surface; the type of lamp (e.g., rear combination lamp, turn signal lamp, headlamp, etc.); and the type of lens for the lamp (e.g., fish-eye lens, fresnel lens, cylindrical lens, reflex reflector, etc.).

Figure 3:
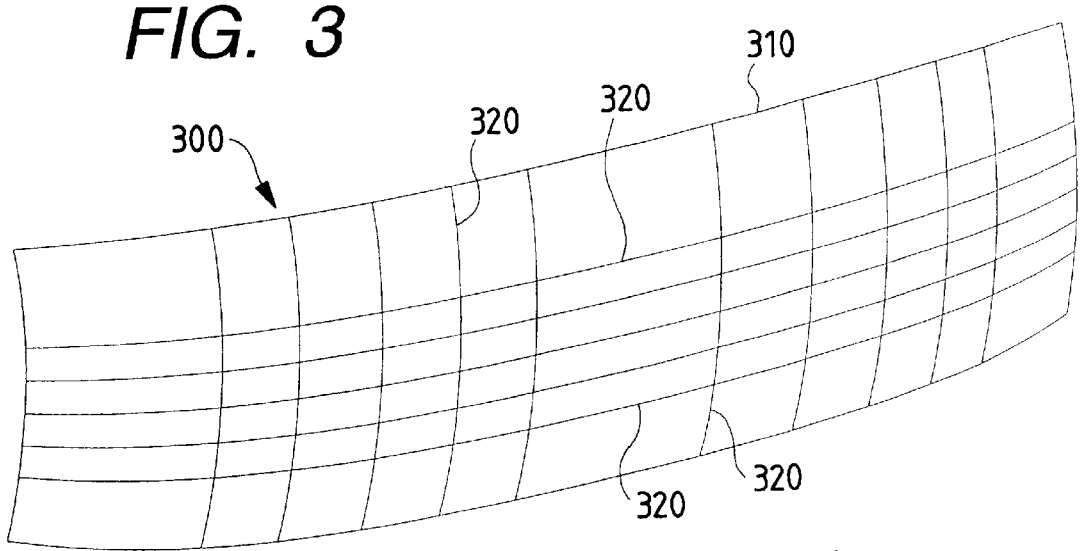
FIG. 3 is a computer-generated drawing graphically illustrating control specifications, including lens frame and curvature information, requested by a motor vehicle manufacturer.

FIG. 3 is a computer-generated drawing 300 which illustrates how the information provided in step 221 looks when displayed. In FIG. 3, reference numeral 310 designates the outer frame of the lens selected by the vehicle maker. The intersecting lines 320 within boundary 310 illustrate the curvature of the lens design desired by the motor vehicle maker.

The information provided by the motor vehicle maker in step 221 is stored in memory 120 under the control of processor 130, for example. Depending on the nature of the specific software and hardware being utilized, it may or may not be necessary for processor 130 to convert the data prior to such storage. Then, in step 222, the lamp designer and/or the motor vehicle manufacturer utilize(s) the information provided in step 221 to cause processor 130 to generate and display a three-dimensional surface model identifying, for example, the periphery dimensions of the lens. A displayed version of such a surface model is designated by reference numeral 400 in FIG. 4.

The surface model 400 created in step 222 has an outer periphery or boundary 410 and is divided into polygons of a shape and size chosen by the operator, whether it be the lamp designer or the motor vehicle maker at this point. In the computer-generated design of FIG. 4, for example, the surface model 400 has been divided into 750 substantially rectangular polygons 420 in response to operator inputs under the control of processor 130. This can be accomplished, for example, by loading the specification data from memory 120, creating a matrix by a calculation procedure, and then generating the corresponding polygons based on information stored in the computer memory or provided by the operator.

The size of polygons 420 is freely selected by the operator. The surface model 400 is stored in memory 120 of the overall computer system and may be displayed on display device 140.

Having discussed sections 210 and 220 of FIG. 2, attention is now directed to section 230 of the FIG. 2 flowchart. In step 231 of section 230, the selected image data resulting from the steps in section 210 is applied to the lens frame data resulting from the steps in section 220 via a mapping procedure performed by processor 130.

Figure 4:
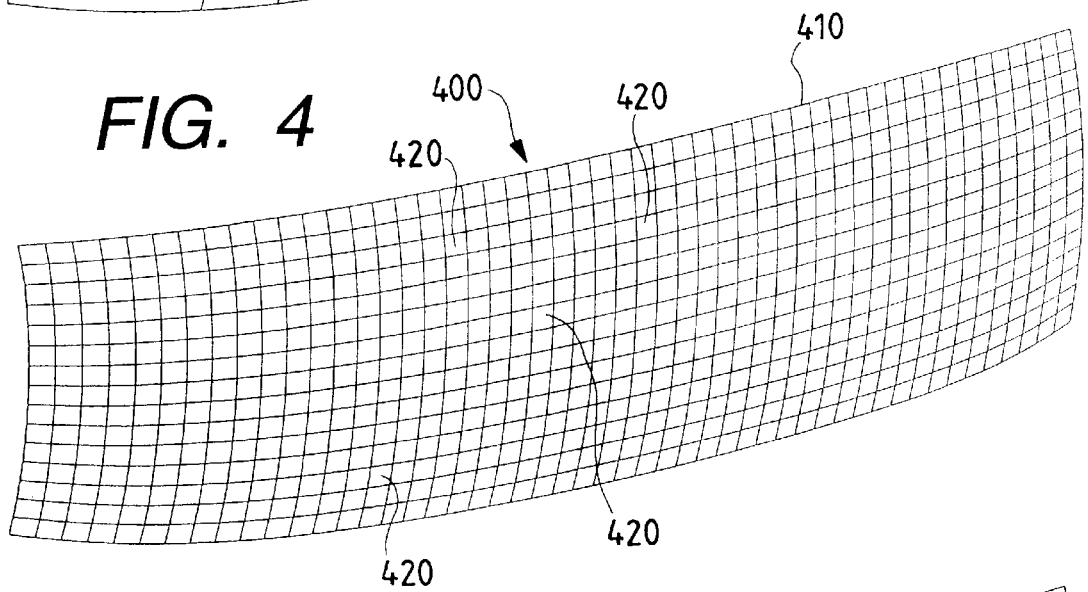
FIG. 4 is a computer-generated drawing which graphically illustrates a surface model created in accordance with information corresponding to that depicted in FIG. 3.

By this procedure, processor 130 first of all interprets each segment 420 of the surface model 400 of FIG. 4 as a polygon. That is, the position and direction of the various polygons and polygon row and columns are determined. Then, processor 130 maps a data file (more precisely, processor 130 maps the thumbnail data stored within a data file) onto each such polygon in the following manner. In the case where the selected thumbnail set includes only a single thumbnail sample, the data file storing the data of that one thumbnail is mapped onto each of the polygons 420. In the case where the selected thumbnail set includes multiple thumbnails, the data files storing the data of such thumbnails are each mapped onto respective ones of the polygons 420. As a result of such mapping, each mapped thumbnail may take on both the size and texture (i.e., curvature) of the polygon onto which it is mapped.

The resulting mapped image is stored by processor 130 in memory 120 and displayed on display unit 140. Such image looks substantially the same as the surface model 400 depicted in FIG. 4, except that rather than being composed of blank or white polygons 420, as in FIG. 4, each polygon would have the appearance of a color image corresponding to a thumbnail mapped from the selected thumbnail set. The overall appearance of the mapped image would be similar to that photographed in section 210, with the exception that the mapped image is composed of optimal thumbnail color image data, incorporates curvature information, and is bounded by the lens frame or perimeter decided upon in section 220.

Figure 5:
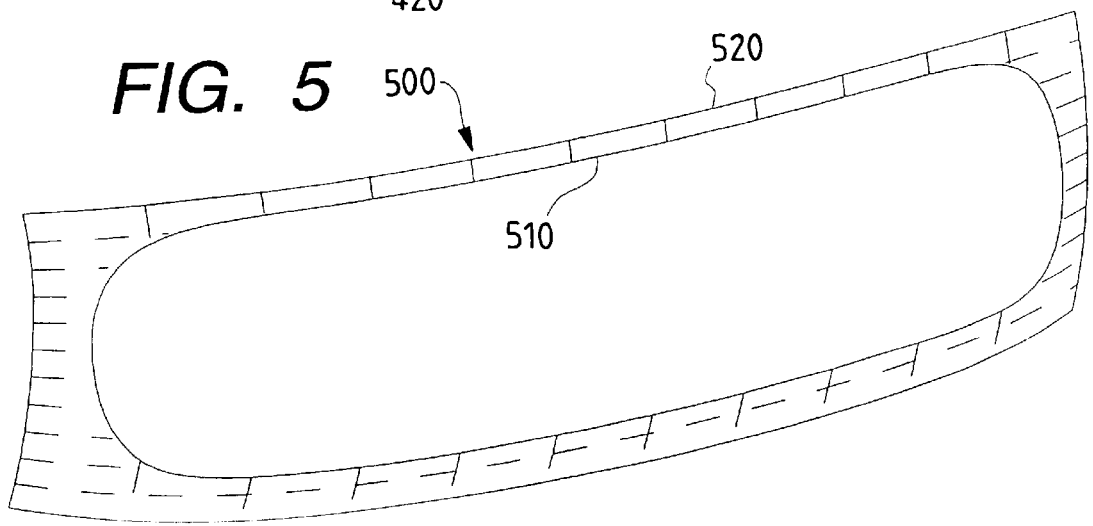
FIG. 5 is a computer-generated drawing of a lens frame mask.

The next step, that is, masking step 232, is essentially optional. In step 232, a mask 500, as shown in FIG. 5, is created by the lamp designer to simulate structure that will be necessary to mount the motor vehicle lamp structure on a motor vehicle. The mask 500 itself does not have any significant optical characteristics; it is merely used to mask out the portions of the mapped image from step 231 which will be covered up by mounting structure at the time when the lamp is ultimately built and mounted onto the vehicle.

As can be seen from FIG. 5, mask 500 has both an inner perimeter 510 and an outer perimeter 520. The mask 500 may be displayed on display device 140 to the extent deemed necessary by the operator.

Figure 6:
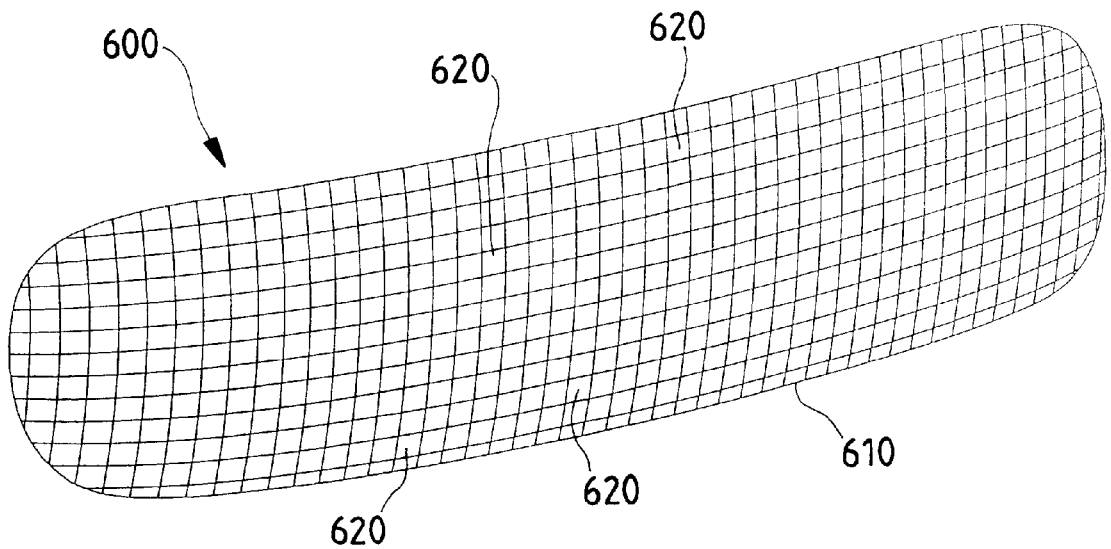
FIG. 6 is a computer-generated drawing of a mapped image that has been masked in accordance with the mask depicted in FIG. 5.

In accordance with step 232, then, processor 130 applies mask 500 to the color mapped image produced in step 231. The resulting image 600 is shown in FIG. 6. The outer periphery 610 of image 600 corresponds dimensionally to the inner perimeter 510 of the mask 500 shown in FIG. 5. The various reference numerals 620 in FIG. 6 correspond respectively to the individual thumbnails making up the masked mapped image 600.

The mapped image from step 231, whether unmasked or masked in accordance with step 232, is then processed for display and thereafter displayed on display device 140 for evaluation purposes. That is, the lamp designer and motor vehicle maker together view the displayed image and/or simulations or variations thereof from a variety of different viewpoints (i.e., the displayed image can be rotated to allow views from all angles) to evaluate the overall appearance of the mapped lamp image. If no design is satisfactory, the design is either varied in size, color, or the like, or, alternatively, a new design will have to be created by returning to sections 210 and 220.

Evaluation criteria considered by the designers include lamp or lens size (e.g., height or width); and lens step size (corresponding to the size of each polygon 420 or mapped thumbnail sample portion 620 of the mapped image shown in FIG. 6). Also, the mapped image can be displayed on a computer-generated drawing of a vehicle design to allow for evaluation of the location of the lamp on the motor vehicle. Additionally, the mapped image can be divided into sections corresponding to different lens components or functions, or a variety of lens designs can be displayed in juxtaposed fashion, so as to allow for evaluation of whether such combinations are satisfactory to the evaluating parties.

Figure 7:
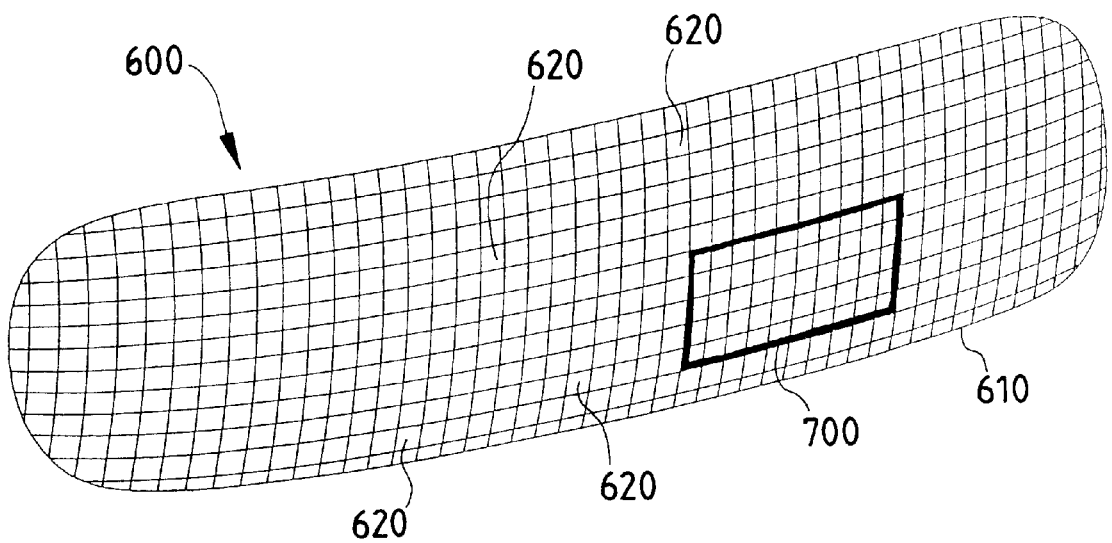
FIG. 7 is a computer-generated drawing of a masked mapped image incorporating a reflex reflector lens component.

An example of a display allowing for such combination evaluation is shown in FIG. 7. The mapped image 600 of FIG. 7 is essentially the same as that depicted in FIG. 6, except that it includes a portion 700 corresponding to inclusion of a reflex reflector lens component. The mapped image could be divided into different colored sections or sections having different functions (stop function, backup function, break function, etc.) in precisely the same fashion. For example, section 700 of mapped image 600 could be a different color than the remainder of the mapped image.

The lamp designer and vehicle manufacturer reach a final decision as to which mapped image is most suitable in step 234. The final mapped image as viewed on display device 140 and agreed upon by the designers constitutes a computer-generated motor vehicle lamp design layout. The specifications of this image are then used by the lamp designer and/or vehicle maker to build an actual motor vehicle lamp product. Although the design layout specifications are stored in memory 120 at this point, such specifications can easily be transferred to other memory (on-line, for example) or printed out on printer 150 in written text or graphical form. That is, the final design layout can be displayed on display 140 and/or printed on printer 150 in accordance with the operator's preference.

The method of the first embodiment depicted in FIG. 2, which could also be performed with respect to the reflector portion of a lamp structure rather than with respect to the lens portion in the manner described above, constitutes a vast improvement in rendering an accurate and detailed design layout during the early initial design stage of motor vehicle lamp production. Consequently, the method of the first embodiment provides significant advantages over conventional design processes currently utilized in the motor vehicle lamp arts. As an example, this method is faster, more efficient, and less cumbersome than other know design processes in use today. Similar advantages are afforded by a second embodiment of the present invention, a flowchart for which is shown in FIG. 8.

The second embodiment of the present invention is similar to that of the first embodiment, but includes additional features providing even further advantages. Most notably, the second embodiment envisions the application of various of the lens design steps in the first embodiment to the reflector portion of a motor vehicle lamp. Once a reflector design has been developed, it is combined with the lens design data to provide a mapped image corresponding to the motor vehicle lamp structure as a whole. In other words, whereas the first embodiment is directed to design of the lens portion of a motor vehicle lamp, the second embodiment seeks to provide a design for the lamp in its entirety, including not only the lens portion, but also the reflector portion (and perhaps other portions) as well.

Figure 8:
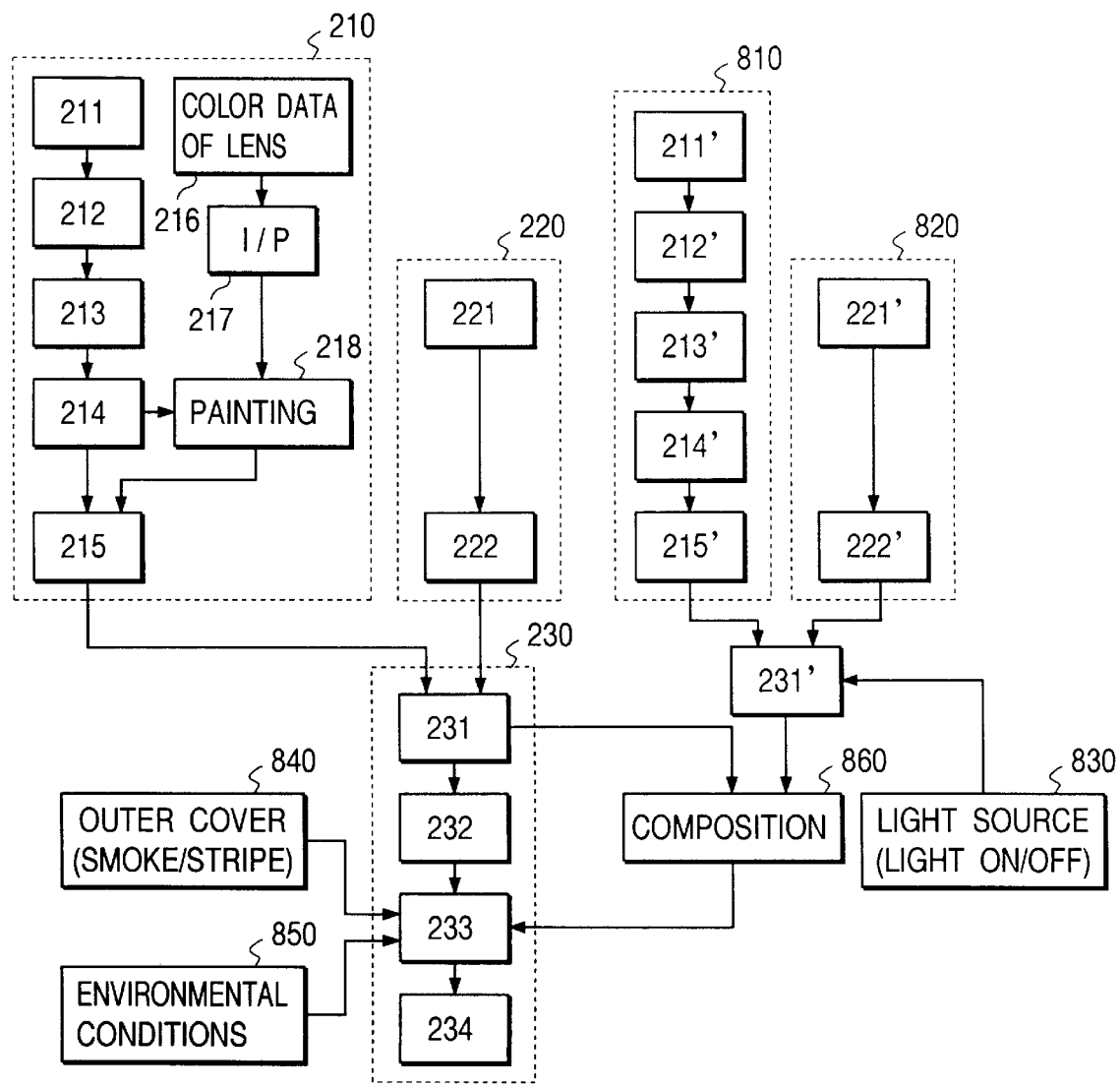
FIG. 8 is a flowchart illustrating steps of a second embodiment of the method of the present invention.

As with the FIG. 2 flowchart for the first embodiment, the FIG. 8 flowchart of the second embodiment is divided into various main sections. Sections 210, 220, and 230 of FIG. 8 are essentially identical to the same-numbered sections depicted in FIG. 2. As such, these sections of FIG. 8 will only be discussed to the extent they differ from the explanation of these sections that has already been presented. It is worth noting again, however, that all of these sections relate to the generation of motor vehicle lens data.

Sections 810 and 820 relate to the generation of motor vehicle reflector data. These sections, along with steps 830, 840, and 850, are explained in detail below.

Turning to section 210 of the flowchart of FIG. 8, steps 211, 212, 213, and 214 are essentially identical to the same-numbered steps depicted in FIG. 2. That is, these steps are performed to create and select thumbnail samples corresponding to photographed lens information. Step 215 is also the same as that for FIG. 2, except that this step in FIG. 8 is adapted to receive additional inputs from steps 216, 217, and 218.

In this connection, step 216 entails the creation of desired color data for the motor vehicle lamp lens under the control of processor 130. Such data may be created using any one of a number of commercially available software programs. The desired color data should be such that it falls within the range of acceptability, both from an aesthetic standpoint and a safety standpoint. For example, it is preferable that the color data should comply with the Japanese Industrial Standard (JIS) and similar standards adopted in other countries. The color information from step 216 is then supplied via input/output circuitry in step 217 to the painting step 218.

In painting step 218, one of two options is carried out by processor 130. The first option is to color or "paint" each of the thumbnails from step 214 with the color information selected in step 216. The other option is to actually create an entirely new thumbnail, without using the scanned information from step 214, in the color selected in step 216. Both of these options result in a thumbnail set including a thumbnail or block of thumbnails in the color selected in step 216. The thumbnail set is then used by step 215 to construct a full image in the same manner as was described above with respect to step 215 of FIG. 2.

Turning to section 220 of FIG. 8, processor 130 performs steps 221 and 222 to generate a surface model such as that depicted in FIG. 4. In this sense, steps 221 and 222 of FIG. 8 are identical to the same-numbered steps of FIG. 2.

Unlike sections 210 and 220, which deal with lens information, sections 810 and 820 of FIG. 8 pertain to the reflector portion of the motor vehicle lamp. Basically, sections 810 and 820 are identical to sections 210 and 220, respectively, except that the steps therein are performed to generate a reflector model rather than a lens model. Thus, the description above with regard to steps 211–215 and 221–222 essentially applies equally to steps 211'–215' and 221'–222', respectively, assuming the term lens is replaced with the term reflector throughout that description.

In step 231' of FIG. 8, the selected reflector image data resulting from the steps in section 810 is applied to the reflector frame data resulting from the steps in section 820 via a mapping procedure performed by processor 130. This is essentially identical to the mapping procedure performed in step 231, except that step 231 relates to lens data whereas step 231' pertains to reflector data.

In step 830, processor 130 applies light source information to the mapped reflector image in step 231'. That is, processor changes the appearance of the mapped reflector image so that it either appears as it would with a light source shining on it, or as it would without a light source shining on it. Step 830 is an optional step and does not necessarily have to be performed each time the method is carried out.

The mapped lens image from step 231 and the mapped reflector image from step 231' are combined together by processor 130 in step 860. The result is a mapped image corresponding somewhat to the mapped image 600 shown in FIG. 6, except that the mapped image resulting from step 860 includes reflector information in addition to lens information. Thus, whereas rotating of the image 600 by processor 130 would give one a three-dimensional view of all sides of a lens, such rotating of the image resulting from step 860 would give one a three-dimensional view of all sides of a complete motor vehicle lamp, with lens and reflector components included. Also, the appearance of the lens portion changes somewhat due to the inclusion of the reflector behind it. That is, a lens on its own, as in the first embodiment, will have a somewhat different appearance that a lens that has a reflector connected behind it, as in the second embodiment, due to transparent characteristics of the lens. This provides an even more accurate representation of how the actual lens will look when installed.

The composite image from step 860 is evaluated in step 233 of FIG. 8 in the same manner as image 600 is evaluated in step 233 of FIG. 2, with several exceptions. For example, the reflective surface structure and light bulb can be more appropriately analyzed in the later case. That is, the mapped image can be viewed from a variety of different angles under the condition where one or more of the bulbs are on or under the condition where all the bulbs are turned off. Also, additional types of simulations, such as rendering/ray tracing, may be performed more appropriately here as well.

Moreover, due to the inclusion of step 840, the composite image may be analyzed under both lit and unlit conditions in the case where its outer cover is provided with smoke and/or stripe features. Furthermore, in accordance with step 850, processor 130 can enhance the authenticity of the simulation in step 233 by adding information regarding environmental conditions (weather, day/night, different sunlight by each country, etc.) and road conditions (curve, tunnel, slope, rough road, etc.). Finally, a matching process between the lamp color and vehicle body color may be performed by processor 130 in step 233 as well.

As with the first embodiment depicted in FIG. 2, the second embodiment shown in FIG. 8 ends with a final decision as to which mapped image is most suitable in step 234. The final mapped image as viewed on display device 140 (and/or as printed on printer 150) and agreed upon by the designers constitutes a computer-generated motor vehicle lamp design layout. The specifications of this image are then used by the lamp designer and/or vehicle maker to build an actual motor vehicle product in the same manner as was described above with reference to the flowchart shown in FIG. 2. Alternatively, the final design layout of the first and second embodiments could be used for non-construction purposes, such as for showing different design alternatives to a car buyer.

It will be apparent to those skilled in the art that various modifications and variations can be made in the method of creating a motor vehicle lamp design layout of the present invention without departing from the spirit or scope of the invention. Thus, it is intended that the present invention cover the modifications and variations of this invention provided they come within the scope of the appended claims and their equivalents.

What is claimed is:

1. A method of generating a motor vehicle lamp structure design layout performed using a data processing system including a memory, the method comprising the steps of:

selecting an image set comprising at least one of the image samples, the selected image set corresponding to a portion of the image determined to have an optimal appearance;

mapping the selected image set onto a second set of image data representing at least a perimeter frame of a motor vehicle lamp structure, the mapping step resulting in a set of mapped image data stored in the memory of the data processing system; and selecting the mapped image data for use as a motor vehicle lamp structure design layout.

2. The method of generating a motor vehicle lamp structure design layout according to claim 1, wherein the design layout is formed to comprise image data representing an image of a lens of a motor vehicle lamp.

3. The method of generating a motor vehicle lamp structure design layout according to claim 1, wherein the design layout is formed to comprise image data representing an image of a reflector of a motor vehicle lamp.

4. The method of generating a motor vehicle lamp structure design layout according to claim 1, wherein the design layout is formed to comprise an image of a complete motor vehicle lamp.

5. The method of generating a motor vehicle lamp structure design layout according to claim 1, wherein the creating step comprises mapping the multiple copies of the selected image set onto a set of image data representing at least a boundary of a motor vehicle lamp structure.

6. A method of generating a motor vehicle lamp structure design layout performed using a data processing system including a memory, the method comprising the steps of:

providing a first set of image data corresponding to an image of at least a portion of a prototype motor vehicle lamp structure to the memory of the data processing system, the image data including a plurality of image samples; corresponding to a portion of the image determined to have an optimal appearance;

mapping the selected image set onto a second set of image data representing at least a perimeter frame of a motor vehicle lamp structure, the mapping step resulting in a set of mapped image data stored in the memory of the data processing system; and conducting multiple simulations using the mapped image data in order to select a version of the mapped image data suitable for use as a motor vehicle lamp structure design layout.

7. The method of generating a motor vehicle lamp structure design layout according to claim 6, wherein the image set selection and mapping steps are performed such that the design layout comprises image data representing an image of a lens of a motor vehicle lamp.

8. The method of generating a motor vehicle lamp structure design layout according to claim 6, wherein the image set selection and mapping steps are performed such that the design layout comprises image data representing an image of a reflector of a motor vehicle lamp.

9. The method of generating a motor vehicle lamp structure design layout according to claim 6, wherein the image set selection and mapping steps are performed such that the design layout comprises image data representing an image of a complete motor vehicle lamp.

10. The method of generating a motor vehicle lamp structure design layout according to claim 6, further comprising the step of scanning one of a photograph and a drawing of at least a portion of a motor vehicle lamp structure in order to generate the first set of image data.

11. The method of generating a motor vehicle lamp structure design layout according to claim 6, wherein the mapping step comprises:

generating multiple copies of the selected image set; and mapping the multiple copies of the selected image set onto the second set of image data in order to form the mapped data set.

12. The method of generating a motor vehicle lamp structure design layout according to claim 6, wherein the mapping step comprises:

generating multiple copies of the selected image set;

arranging the second set of image data into a plurality of polygon segments; and mapping each of the multiple copies onto a corresponding one of the polygon segments.

13. The method of generating a motor vehicle lamp structure design layout according to claim 6, wherein the mapping step comprises:

generating a set of image data representing a mask corresponding to a mounting structure portion of a motor vehicle lamp structure; and applying the image data representing the mask to the second set of image data in order mask out edge portions of the second set of image data.

14. The method of generating a motor vehicle lamp structure design layout according to claim 6, further comprising the steps of:

selecting an image set comprising at least one of a plurality of image samples from among a third set of image data stored in the memory of the data processing system, the third set of image data representing an image of at least a portion of a motor vehicle lamp structure other than that represented by the first set of image data;

mapping the selected image set from the third set of image data onto a fourth set of image data representing at least a perimeter frame of a motor vehicle lamp structure other than that represented by the second set of image data; and combining the mapped image data from the first and second sets with the mapped image data from the third and fourth sets in order to form a set of composite mapped image data stored in the memory of the data processing system, wherein the step of selecting mapped image data for use as a motor vehicle lamp structure design layout comprises selecting the composite mapped image data for use as the motor vehicle design layout.

15. A method of generating a motor vehicle lamp structure design layout in an initial stage of designing a motor vehicle, the method being performed by a data processing system including a memory, the method comprising the steps of:

providing a first set of image data corresponding to an image of at least a portion of a prototype motor vehicle lamp structure to the memory of the data processing system, the image data including a plurality of image samples;

selecting an image set comprising at least one of the image samples, the selected image set providing image data corresponding to an image of at least a portion of a prototype motor vehicle lamp structure to the memory of the data processing system, the image data including a plurality of image samples;

selecting an image set comprising at least one of the image samples, the selected image set corresponding to a portion of the image data determined to have an optimal appearance;

generating multiple copies of the selected image set; and creating a design layout at least partially composed of the multiple copies of the selected image set, the design layout comprising image data representing an image of at least a portion of a motor vehicle lamp structure.

16. The method of generating a motor vehicle lamp structure design layout according to claim 15, wherein the conducting step comprises viewing the image represented by the mapped image data on a display device from a variety of different viewpoints.

17. The method of generating a motor vehicle lamp structure design layout according to claim 15, wherein the conducting step comprises viewing the image represented by the mapped image data on a display device under lit and unlit motor vehicle lamp conditions.

18. The method of generating a motor vehicle lamp structure design layout according to claim 15, wherein the conducting step comprises viewing the image represented by the mapped image data on a display device under different environmental conditions.

19. The method of generating a motor vehicle lamp structure design layout according to claim 15, wherein the conducting step comprises viewing the image represented by the mapped image data on a display device under different road conditions.

20. The method generating a motor vehicle lamp structure design layout according to claim 15, wherein the conducting step comprises viewing the image represented by the mapped image data on a display device against different vehicle body colors.

21. A method of generating a motor vehicle lamp structure design layout performed using a data processing system including a memory, the method comprising the steps of:

providing image data corresponding to an image of at least a portion of a prototype motor vehicle lamp structure to the memory of the data processing system, the image data including a plurality of image samples;

determining a region of the image of the prototype motor vehicle lamp structure having an optimal appearance;

selecting an image set comprising at least one of the image samples, the selected image set corresponding to the determined region of the image;

generating multiple copies of the selected image set; and creating a design layout at least partially composed of the multiple copies of the selected image set, the design layout comprising image data representing an image of at least a portion of a motor vehicle lamp structure.

* * * * *